US010808162B2

(12) United States Patent
Yang et al.

(10) Patent No.: US 10,808,162 B2
(45) Date of Patent: Oct. 20, 2020

(54) CRUSH RESISTANT BUOYANT BALL SEALERS

(71) Applicant: FAIRMOUNT SANTROL INC., Independence, OH (US)

(72) Inventors: Huaxiang Yang, Sugar Land, TX (US); An Thien Nguyen, Sugar Land, TX (US); Vinay Mehta, Richmond, TX (US)

(73) Assignee: FAIRMOUNT SANTROL INC., Independence, OH (US)

( * ) Notice: Subject to any disclaimer, the term of this patent is extended or adjusted under 35 U.S.C. 154(b) by 0 days.

(21) Appl. No.: 16/171,414

(22) Filed: Oct. 26, 2018

(65) Prior Publication Data

US 2019/0153296 A1 May 23, 2019

Related U.S. Application Data

(60) Provisional application No. 62/587,996, filed on Nov. 17, 2017.

(51) Int. Cl.
| | |
|---|---|
| *E21B 33/138* | (2006.01) |
| *C09K 8/518* | (2006.01) |
| *C09K 8/508* | (2006.01) |
| *B01J 13/04* | (2006.01) |

(52) U.S. Cl.
CPC ............... *C09K 8/518* (2013.01); *B01J 13/04* (2013.01); *C09K 8/508* (2013.01); *E21B 33/138* (2013.01)

(58) Field of Classification Search
CPC ....... E21B 47/1015; E21B 47/12; E21B 49/08
See application file for complete search history.

(56) References Cited

U.S. PATENT DOCUMENTS

| | | | |
|---|---|---|---|
| 2,803,306 | A | 8/1957 | Hower |
| 3,724,549 | A | 4/1973 | Dill |
| 3,797,575 | A | 3/1974 | Dill et al. |
| 3,872,923 | A | 3/1975 | Knight et al. |
| 3,954,629 | A | 5/1976 | Scheffel et al. |
| 4,005,753 | A | 2/1977 | Scheffel et al. |
| 4,102,401 | A | 7/1978 | Erbstoesser |
| 4,527,628 | A | 7/1985 | Dill et al. |
| 4,716,964 | A | 1/1988 | Erbstoesser et al. |
| 5,356,149 | A * | 10/1994 | Kane ............. A63B 43/00 264/328.1 |

(Continued)

FOREIGN PATENT DOCUMENTS

| | | |
|---|---|---|
| EP | 2884041 A1 | 6/2015 |
| GB | 2025485 A | 1/1980 |

(Continued)

OTHER PUBLICATIONS

Search Report and Written Opinion for International Application No. PCT/US2017/052204 dated Dec. 18, 2017.

(Continued)

*Primary Examiner* — Silvana C Runyan
(74) *Attorney, Agent, or Firm* — Calfee, Halter & Griswold LLP

(57) ABSTRACT

A perforation ball sealer for temporarily plugging a perforation in an oil or gas well comprises a polymer foam core and a shell surrounding the core formed from a solid or essentially solid second polymer. Both the core and the shell are made from slowly water-soluble polymers.

26 Claims, 2 Drawing Sheets

(56) References Cited

U.S. PATENT DOCUMENTS

| | | | |
|---|---|---|---|
| 5,824,746 A * | 10/1998 | Harris | A63B 37/0003 |
| | | | 525/196 |
| 5,852,114 A | 12/1998 | Loomis et al. | |
| 6,367,548 B1 | 4/2002 | Purvis et al. | |
| 6,380,138 B1 | 4/2002 | Ischy et al. | |
| 9,303,474 B2 * | 4/2016 | Shindgikar | C09K 8/516 |
| 9,914,872 B2 * | 3/2018 | Wehunt | C09K 8/70 |
| 2001/0044477 A1 * | 11/2001 | Soane | B01J 13/02 |
| | | | 521/60 |
| 2006/0175059 A1 | 8/2006 | Sinclair et al. | |
| 2007/0169935 A1 | 7/2007 | Akbar et al. | |
| 2009/0255674 A1 | 10/2009 | Boney et al. | |
| 2012/0285695 A1 | 11/2012 | Lafferty et al. | |
| 2014/0345785 A1 | 11/2014 | Wang et al. | |
| 2014/0345878 A1 * | 11/2014 | Murphree | C09K 8/703 |
| | | | 166/377 |
| 2016/0281454 A1 | 9/2016 | Zhu et al. | |
| 2017/0210976 A1 | 7/2017 | Okamoto et al. | |
| 2018/0346800 A1 | 12/2018 | Fu et al. | |

FOREIGN PATENT DOCUMENTS

| | | |
|---|---|---|
| WO | 2012174065 A1 | 12/2012 |
| WO | 2013101702 A1 | 7/2013 |
| WO | 2014074326 A1 | 5/2014 |

OTHER PUBLICATIONS

Injection Molding Processing Guide, www.bergenintrenational.com/pdfs/Injection_Molding_Processing_Guide, Sep. 3, 2009; Lemaster, Tips and Techniques: How to Mold & Extrude Using Chemical Blowing Agents, Plastics Technology, Feb. 2011, http//www.ptonline.com/articles/hot-to-mold-extrude-using-chemical-blowing-agents.

Gabriel et al., "The Design of Buoyant Ball Sealer Treatments", SPE 13085; 1984; Society of Petroleum Engineers of AIME.

Foamazol Chemical Foaming Agents, Injection Molding Processing Guide, Bergen International, 2008; 7 pages.

Office Action for U.S. Appl. No. 15/708,957 dated Sep. 5, 2019.
Search Report for Denmark Application No. PA 2019 70233 dated Oct. 4, 2019.

Examination Report for Denmark Application No. PA 2019 70233 dated May 12, 2020.

* cited by examiner

CRUSH RESISTANT BUOYANT BALL SEALERS

CROSS-REFERENCE TO RELATED APPLICATION

This application is based on and claims priority to Provisional Application Ser. No. 62/587,996, filed Nov. 17, 2017, the entire disclosure of which is incorporated herein by reference.

BACKGROUND

Perforation ball sealers are used in the oil and gas recovery industries to temporarily plug perforations made in an oil or gas well to divert the flow of treatment fluid from zones in the geological formation exhibiting higher permeabilities to zones exhibiting lower permeabilities.

Early ball sealers were made from permanent materials such as nylon, phenolics and rubber coated metal, requiring mechanical processing for ball sealer removal. Later ball sealers were made from polymers and copolymers of lactic acid esters which are slowly soluble in acidified water, thereby making mechanical removal unnecessary. See, for example, U.S. Pat. No. 4,716,964 to Erbstrosser et al., the disclosure of which is incorporated herein by reference in its entirety. Numerous other slowly water-soluble materials have also been proposed for making ball sealers, examples of which include polyethylene oxides (PEO), naturally occurring polymers such as collagen and chitosan, polyvinyl alcohol polymers (PVOH), ethylene vinyl alcohol copolymers (EVOH), and the like.

To prevent ball sealers from sinking to the bottom of a well before engaging the perforations to be sealed, they preferably should exhibit a density which is similar to, or even less than, the density of the treatment fluid in which they are supplied. See, for example, Gabriel et al., "The Design of Buoyant Ball Sealer Treatments", SPE 13085) which reports that all ball sealers having a density less than that of their treating fluids can achieve 100% seating efficiency in both fracturing and matrix treatments because they avoid sinking to the bottom of the drill string.

Unfortunately, most of the slowly water-soluble polymers from which ball sealers can be made exhibit densities which are greater than the densities of the aqueous treatment fluids in which these ball sealers will be used.

To address this issue, U.S. 2017/0210976 to FracSolutions Technologies suggests that, where ball sealers with densities as low as 0.9-1.0 g/cc are desired, the ball sealers can be foamed by using chemical or physical blowing agents. However, the crush strengths of most polymer foams are less than the compressive stress normally encountered when most ball sealers are used, especially in hydraulic fracturing operations. As a result, ball sealers made from simple polymer foams cannot be used in these operations, as a practical matter.

SUMMARY

In accordance with this invention, perforation ball sealers exhibiting desirably low densities as well as desirably high crush strengths are provided by forming the ball sealer form a polymer foam core and a shell surrounding the core formed from a solid or essentially solid polymer.

Thus, this invention provides a perforation ball sealer for use in temporarily plugging perforations in an oil or gas well, the perforation ball sealer comprising a polymer foam core made from a first slowly polymer and a shell surrounding the core formed from a solid or essentially solid second polymer, wherein both the first and second polymers are slowly water-soluble, and further wherein the ball sealer exhibits a density of 1.1 g/cc or less and a crush strength of 1,000 psi (~69 dyne/cm) or more when dry.

In addition, this invention also provides a method for temporarily plugging perforations in an oil or gas well comprising introducing into the well an aqueous treatment fluid containing a mass of the above ball sealers.

BRIEF DESCRIPTION OF THE DRAWINGS

This invention may be more readily understood by reference to the following drawings wherein.

DETAILED DESCRIPTION

Physical Form and Properties

Figure 1:
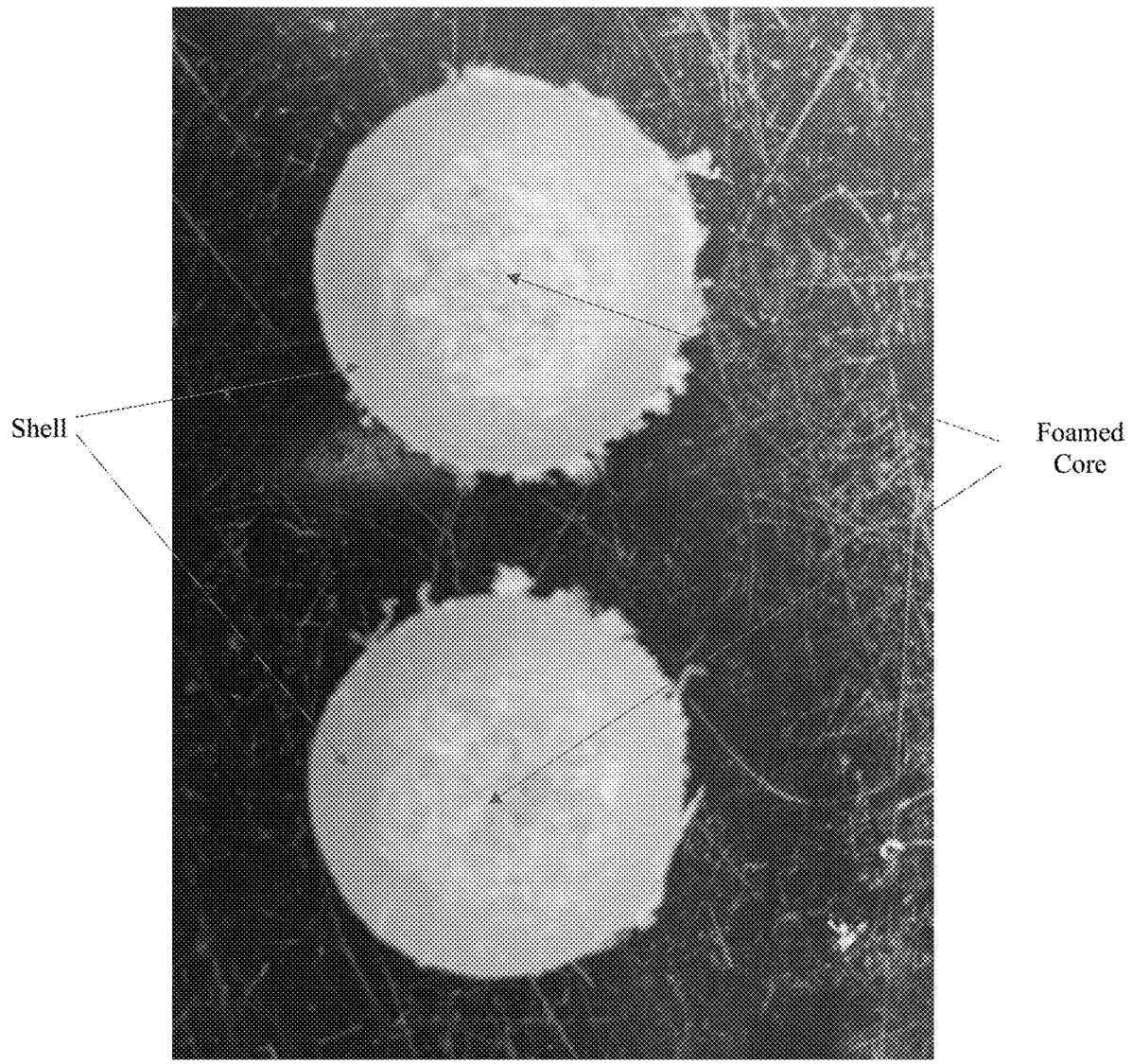
FIG. 1 is a photograph of the inventive perforation ball sealers of the following Example 1.

The inventive ball sealer has a conventional physical form and size. That is to say, it is a sphere having a diameter normally used in the oil and gas industry, which typically range from as much as 5 inches to as little as ½ inch. Normally, the inventive ball sealers will have diameters of ⅝ inch to 1½ inch, more typically ⅞ inch to 1¼ inch. Specific examples of typical diameters include ⅝ inch, ¾ inch, ⅞ inch, 1 inch, 1⅛ inch, 1¼ inch, and 1½ inch.

As indicated above, rather than having a solid, homogenous structure, the inventive ball sealer takes the form of a polymer foam core and a shell surrounding the core formed from a solid or essentially solid polymer. As a result, the density of the inventive ball sealer as a whole can be reduced to a desirably low level by virtue of its foam core, while the crush strength of the inventive ball sealer as a whole can be maintained at a desirably high level by virtue of its outer shell.

In this regard, the inventive perforation ball sealers are desirably formulated to have an overall density of 1.1 g/cc or less, more desirably 1.05 g/cc or less, 1.0 g/cc or less, 0.95 g/cc or less, 0.90 g/cc or less, 0.8 g/cc or less, 0.7 g/cc or less, or even 0.6 g/cc or less, in order to prevent them from sinking in the treatment fluid in which they are used. In this context, "overall density" means the density of the ball sealer as a whole.

In addition, the inventive perforation ball sealers are also desirably formulated to have a crush strength of at least 1,000 psi (~69 dyne/cm) when dry in order that they can withstand the compressive stresses that may be encountered downhole. More desirably, they are formulated to have a crush strength of at least 1,100 psi (~76 dyne/cm), at least 1,250 psi (~86 dyne/cm), at least 1,500 psi (~103 dyne/cm), at least 1,750 psi (~121 dyne/cm), or even at least 2,000 psi (~138 dyne/cm), when dry. This substantial crush strength is due to the fact that foaming of the inventive ball sealer resides primarily in its central core which, in turn, enables the shell surrounding this core to exhibit a fairly uniform and substantial thickness.

Slowly-Water Soluble Polymers

The inventive perforation balls are made from slowly-water soluble polymers. In the context of this disclosure, this means that the particular polymer or polymers used to make a ball sealer intended for use in a particular application are selected so that they dissolve, depolymerize or otherwise decompose at a useful dissolution rate under the conditions of temperature and pH that will be encountered in that application.

In this regard, oil and gas bearing subterranean formations where ball sealers are used can exhibit widely differing downhole conditions of temperatures and pH. Some exhibit low downhole temperatures, e.g., ~75° F. to 200° F. (~24° C. to ~93° C.). Others exhibit medium downhole temperatures, e.g., ~150° F. to 250° F. (~66° C. to ~121° C.). And still others exhibit high downhole temperatures, e.g., ~200° F. to 350° F. (~93° C. to ~177° C.) and higher.

In addition, depending on the naturally occurring ground water found there as well as the liquids pumped downhole either before or together with the ball sealers, each of these formations can also exhibit widely differing pH conditions. Thus, some formations exhibit alkaline conditions (e.g., pH of 9-11), while others exhibit neutral conditions (e.g., pH of ~7). Still others exhibit highly acidic conditions (e.g., pH of ~0 to 1 or even −1 to 0) from being treated with strong acids, e.g., 15% HCl, during acidizing or matrix acidizing.

Potentially, therefore, nine different sets of downhole conditions can be found where ball sealers are present in oil and gas bearing subterranean formations—low, medium or high temperature at alkaline, neutral or the highly acidic pH associated with acidizing treatments.

As appreciated in the ball sealer art, the particular ball sealer used in a particular well is selected so that, under the particular conditions of temperature and pH that will be encountered, it dissolves, depolymerizes or otherwise decomposes in the aqueous fluids it encounters at a useful dissolution rate, i.e., at a rate which is slow enough to allow the treatment process to be completed but fast enough so that it dissolves, depolymerizes or otherwise decomposes promptly after the treatment process is done. Normally, this dissolution rate will be such that the ball sealer effectively loses its ability to seal the perforation in which it is received within a predetermined period of time, e.g., 2 to 24 hours, after being received in its perforation.

In accordance with this invention, therefore, the particular polymer or polymers that are selected to make a ball sealer for use in a particular application are selected so that the ball sealer obtained dissolves, depolymerizes or otherwise decomposes at a useful dissolution rate under the conditions of temperature and pH that are anticipated to be encountered in that application. Preferably, the polymer or polymers are selected so that 35% of the mass of a ball sealer made from this polymer or polymers is lost within 2 to 24 hours, more typically 3-13 hours, of continuous exposure to water maintained at this temperature and pH.

Examples of slowly-water soluble polymers that are useful for this purpose are described in the above-mentioned U.S. 2017/0210976 and include polyvinyl alcohol (PVOH), polyglycolic acid (PGA), polytrimethylene terephthalate (PTT), polylactic acid (PLA), polybutylene succinate (PBS), polybutylene adipate terephthalate (PEAT), polybutylene adipate succinate (PBAS), polyvinyl acetate (PVA), polyethylene oxides (PEO), ethylene vinyl alcohol copolymers (EVOH), and naturally occurring polymers such as collagen and chitosan. Blends of these slowly water-soluble polymers can also be used.

Preferred slowly water-soluble polymers are those described in commonly-assigned application Ser. No. 62/396,960, filed Sep. 20, 2016, the disclosure of which is also incorporated herein by reference in its entirety. As described there, certain specific slowly water-soluble polymers each exhibit useful dissolutions rates at widely different conditions of temperature and pH such that certain groups of these polymers containing only a very few members per group, e.g., groups containing only two or three polymers per group, are needed to provide a system of perforation ball sealers which can be used at all nine of the different downhole conditions of temperature and pH—i.e., low, medium or high temperature at alkaline, neutral or the highly acidic pH associated with acidizing treatments.

Examples of these slowly-water soluble polymers include
(a) molding grade vinyl alcohol/vinyl acetate copolymers (PVOH) having a degree of hydrolysis of ~50% to 84%;
(b) vinyl alcohol/vinyl acetate copolymers (PVOH) having a melting point of 200° C. to 240° C., a melt flow index (MFI) at 220° C. of 10-15 g/10 minute and a viscosity at 220° C. of 150-1500 Pa-sec.;
(c) vinyl alcohol/vinyl acetate copolymers (PVOH) having a degree of hydrolysis of ~50% to 84%;
(d) molding grade ethylene/vinyl alcohol copolymers (EVOH) containing 24-48 mol % ethylene and having a degree of hydrolysis of 85% to 99%:
(e) vinyl alcohol/vinyl acetate copolymers (PVOH) having a degree of hydrolysis of 85% or more;
(f) fully amorphous grade polylactic acid ester (PLA) polymers;
(g) molding grade polylactic acid ester polymers (PLA);
(h) condensation polymers or copolymers of one or more hydroxy-substituted $C_1$-$C_{10}$ carboxylic acids, and
(i) water-soluble polyether polymers having a weight average molecular weight of 100,000 to 5,000,000.

Examples of specific groups of these slowly-water soluble polymers which, in combination, are useful for multiple different downhole conditions include Group 1:
  Either or both, including blends, of
  (i) a molding grade vinyl alcohol/vinyl acetate copolymer (PVOH) having a degree of hydrolysis of ~50% to 84%, and
  (ii) a vinyl alcohol/vinyl acetate copolymer (PVOH) having a melting point of 200° C. to 240° C., a melt flow index (MFI) at 220° C. of 10-15 g/10 minute and a viscosity at 220° C. of 150-1500 Pa-sec.;

Group 2:
  Either or both, including blends, of
  (iii) a vinyl alcohol/vinyl acetate copolymer (PVOH) having a degree of hydrolysis of ~50% to 84%, and
  (iv) a molding grade ethylene/vinyl alcohol copolymer (EVOH) containing 24-48 mol % ethylene and having a degree of hydrolysis of 85% to 99%:

Group 3:
  Blends of
  (v) 40 to 90 wt. % of one or more vinyl alcohol/vinyl acetate copolymers (PVOH) having a degree of hydrolysis of 85% or more, and
  (vi) 10 to 60 wt. % wt. % of one or more fully amorphous grade polylactic acid ester (PLA) polymers; and Group 4:
  Blends of
  (vii) at least one of
    (α) a molding grade polylactic acid ester polymer (PLA), and
    (β) a condensation polymer or copolymer of one or more hydroxy-substituted $C_1$-$C_{10}$ carboxylic acids, and
  (viii) 5 to 25 wt. % of a water-soluble polyether polymer having a weight average molecular weight of 100,000 to 5,000,000.

Additional slowly water-soluble polymers which are useful in this invention, including blends of these polymers, are described below:

MR ("Medium Temperature Range") Resins
(1) PVOH polymer exhibiting a DH (degree of hydrolysis) of 70-75 and a viscosity of 4.2-5.0 mPa s when measured in a 4% aqueous solution at 20° C. according to DIN 53015.
(2) Blends of 60 wt. % of the PVOH polymer of PVOH polymer exhibiting a DH (degree of hydrolysis) of 70-75 and a viscosity of 4.2-5.0 mPa s when measured in a 4% aqueous solution at 20° C. according to DIN 53015 and 40 wt. % of the EVOH polymer of molding grade EVOH polymer (ethylene vinyl alcohol copolymer) which contained 24-48 mol % ethylene and had a degree of hydrolysis of 98 to 99%.

HR ("High Temperature Range") Resins
(1) molding grade PVOH polymer (vinyl alcohol polymers) having a melting point of 200° C. to 240° C., a melt flow index (MFI) at 220° C. of 10-15 g/10 min., a viscosity at 220° C. of 150-1500 Pa-sec
(2) Molding grade EVOH polymer (ethylene vinyl alcohol copolymer) which contained 24-48 mol % ethylene and had a degree of hydrolysis of 98 to 99%

LAR ("Low Acid") Resins
Combinations of (a) and (b) and (c) where
(a) is PLA (such as molding grade polylactic acid ester polymers (PLA) having a relative viscosity of 2.5, a D-isomer content of 1.4%, a melt flow rate of 80 g/10 min at 210° C. and a melt flow rate of 38 g/10 min at 190° C.),
(b) is condensation polyester copolymer of hydroxybutyrate (PHB) and hydroxyhexanoate (PHH), and
(c) up to 20% commercially available fully water soluble polyether polymer (PEOs) having a molecular weight of 200,000 Daltons These additional slowly water-soluble polymers and system can be summarized in the following table:

| Application Conditions | Neutral (pH 6-8) | Basic (pH 7-12) | Acidic (pH 1-6) |
| --- | --- | --- | --- |
| High Range Temperature (175° F.-300° F.) | | Thermoplastic polyvinyl alcohols blend mp: 220° C.; MFI (220° C.): 10-15 g/10 min Viscosity (220° C.): 150-1500 Pa-sec Specific Gravity: 0.5-1.0 | Copolymer of hydroxybutyrate and hydroxyhexanoate Mw: 400K-900K mp: 145° C. Specific Gravity: 1.1-1.2 |
| Low Range Temperature (75° F.-200° F.) | | Thermoplastic Polyvinyl alcohols blend mp: 180-200° C. MFI: 15-35 g/10 min Viscosity (190° C.): 90-900 Pa-sec Specific Gravity: 0.5-1.0 | |

As indicated above, the inventive perforation ball sealer is composed of two different sections, a polymer core and a polymer shell surrounding the core. In accordance with this invention, these different sections can be made from different slowly water-soluble polymers, if desired. However, normally, both sections will be made from the same slowly water-soluble polymer.

Method of Manufacture

The inventive perforation ball sealers can be made by any method which will produce spherical or essentially spherical polymer products have the core and shell structure described above.

Most commonly, they will be made by an injection molding process in which a chemical foaming (blowing) agent and a single polymer or polymer blend which forms both the core and shell of the ball sealer are fed to a plasticizing extruder, i.e., an extruder which heats the polymer to its softening temperature, after which the softened polymer so-formed is injection molded. If a chemical foaming agent is used, as further discussed below, the temperature of the extruder can also be controlled so that decomposition of this foaming agent in the feeding section of the extruder is avoided, while all or essentially all of this chemical foaming agent decomposes to generate foaming gas in the extruder's compression section. Also if desired, the temperature at the nozzle of the extruder can be reduced by a suitable amount to increase back pressure and improve the melt strength of the extrudate. Thereafter, the molten or semi-molten polymer extrudate so formed is fed to a conventional injection molding machine where it foams and is formed into a part with the desired shape.

Processes for injection molding polymer foams are well-known commercially and described in many different publications including Bergen International, Injection Molding Processing Guide, www.bergenintrenational.com/pdfs/Injection_Molding_Processing_Guide, Sep. 3, 2009; Lemaster, Tips and Techniques: How to Mold & Extrude Using Chemical Blowing Agents, Plastics Technology, February 2011, http//www.ptonline.com/articles/hot-to-mold-extrude-using-chemical-blowing-agents.

As well understood in the art, two different types of foaming agents can be used for making injected molded foams, physical foaming agents and chemical foaming agents. Physical foaming agents are gasses such as nitrogen and carbon dioxide that re injected under high pressure directly into the polymer melt. Meanwhile, chemical foaming agents are specific chemicals that decompose when heated to yield gaseous decomposition products dispersed in the polymer melt. Although physical foaming agents can be used to make the inventive ball sealers, chemical blowing agents will normally be used, as they are simpler and easier to use and, in addition, enable more precise control of the amount of foaming and hence the density of the injected molded product ultimately obtained.

As also well understood in the art, chemical foaming agents can be categorized as either being endothermic or exothermic. Endothermic chemical foaming agents, which typically release carbon dioxide and/or water vapor, absorb energy as they decompose. Calcium carbonate, sodium citrate and citric acid powder are good examples of this type of foaming agent. Exothermic chemical foaming agents, which typically release nitrogen gas, generate energy as they decompose. Various azo compounds and hydrazides are good examples of this type of foaming agent.

In accordance with this invention, both of types of these chemical foaming agents can be used, as can mixtures of physical and chemical foaming agents. However, endothermic chemical blowing agents will normally used, as not only do then enable foaming to be controlled more easily but, in addition, their decomposition products are compatible with most slowly water-soluble polymers.

Normally, the amount of chemical foaming agent used will be about 2-5 wt. %, based on the weight of the slowly water-soluble polymer used. However, amounts as low as 1.5 wt. %, 1.0 wt. %, 0.75 wt. % or even 0.5 wt. % can be used as well as amounts as high as 7.5 wt. %, 10 wt. %, 12 wt. % or even 15 wt. %. If physical rather than chemical foaming agents are used, then comparable amounts of the physical foaming agents will be used, i.e., amounts which generate a comparable amount of foaming gas.

As indicated above, the inventive perforation ball sealers preferably exhibit a density of 1.05 g/cc or less so that they avoid sinking in the aqueous treatment fluids in which they are used. This means that the effect of foaming in accordance with this invention is to reduce the density of the inventive ball sealer obtained as compared with an otherwise identical conventional ball sealer made without foaming by some particular percentage. For example, in the case of an inventive ball sealer which exhibits a density of 1.0 g/cc and which is made from a slowly water-soluble polymer having a density of 1.5 g/cc, the effect of foaming in accordance with this invention is to reduce the density of the inventive ball sealer by 33% [(1.5−1.0)/1.5], meaning that the density of this inventive ball sealer is 67% of its non-foamed conventional counterpart.

In accordance with this invention, foaming is carried out in such a way that the amount of density reduction achieved can be as little as 5% to as much as 67%% relative to the density of the non-foamed conventional counterpart. More typically, the amount of density reduction achieved will be between 10% to 30%, 12% to 25% or even 14% to 22% relative to the density of the non-foamed conventional counterpart. This, in turn, means that the density of the inventive ball sealer can be as little as 33% to as much as 95% of its non-foamed conventional counterpart. More typically, the density of the inventive ball sealer will be 70% to 90%, 75% to 88% or even 78% to 86% of its non-foamed conventional counterpart. Persons of ordinary skill in the injection molding art should have no difficulty in achieving these density reductions by suitable adjustment of the type and amounts of chemical blowing agents used as well as control of extruder temperature and other extruder variables.

EXAMPLES

In order to more thoroughly describe this invention, the following working examples are provided:

Example 1

A group of inventive perforation ball sealers was made by injection molding a slowly water-soluble polymer in accordance with the general procedures discussed above. A sample ball sealer so made was then sectioned and photographed, a copy of which is reproduced in FIG. 1.

As can be seen from this photograph, the inventive ball sealer exhibited a shell and core structure, with the core being composed of an expanded polymer foam and with the shell exhibiting a relatively uniform thickness.

Another sample of this ball sealer was analyzed for density and crush strength and found to exhibit a density of ~0.89 g/cc and a crush strength of 19,000 psi in both dry conditions and after having been immersed in 2% KCl for two hours.

Example 2

Figure 2:
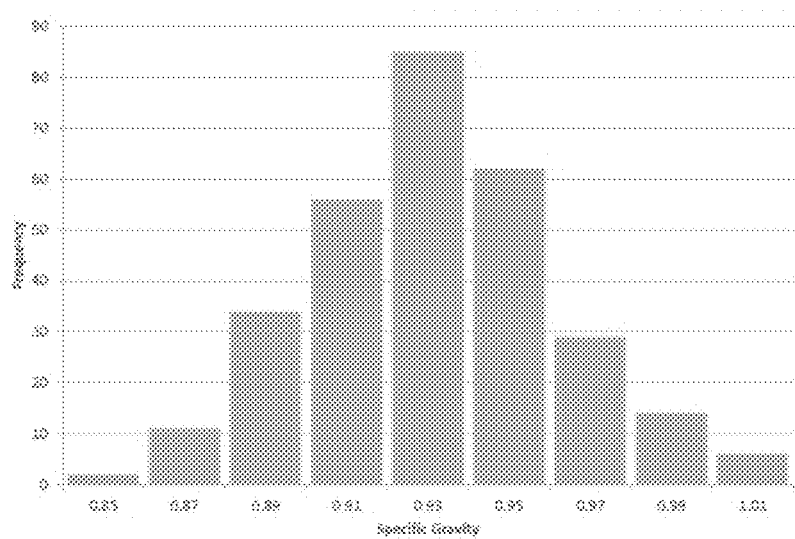
FIG. 2 is a histogram showing the specific gravity range of the inventive buoyant ball sealers of the following Example 2.

Conventional ball sealers made using known water-soluble or biodegradable polymers or polymer blends can have specific gravity ranging from 1.10 to 1.40 g/cc. Compared to this, the histogram of FIG. 2 shows the specific gravity range produced in one case for the buoyant ball sealers made in accordance with this invention. Depending on the amount of foaming agent and processing conditions, densities ranging from 0.4 to 1.1 can be obtained.

Example 3

Another group of buoyant ball sealers made in accordance with this invention was subjected to solubility testing in accordance with the solubility testing procedures described in the above-mentioned commonly-assigned application Ser. No. 62/396,960. For the sake of comparison, a group of conventional comparable ball sealers was also tested.

The inventive ball sealer exhibited essentially the same dissolution profile as the conventional ball sealers, thereby indicating the inventive ball sealers will provide an equivalent performance to their conventional counterparts even though their densities have been significantly reduced.

Example 4

Example 3 was repeated, except that a different slowly water-soluble polymer, designated as "HR", was used. In addition, only two solubility tests were done using two different aqueous test fluids, one containing 2% KCl at 175° F., the other containing NaOH to pH 11 also at 175° F.

Examination showed that these inventive buoyant ball sealers also exhibit dissolution profiles which are essentially the same as their conventional non-foamed counterparts.

Although only a few embodiments of this invention have been disclosed above, it should be appreciated that many modifications can be made without departing from the spirit and scope of this invention. All such modifications are intended to be included within the scope of this invention, which is to be limited only by the following claims.

The invention claimed is:

1. A perforation ball sealer for use in temporarily plugging a perforation in an oil or gas well, the perforation ball sealer being made by injection molding a molten mass of a slowly water soluble polymer containing bubbles generated during injection molding by a physical or chemical foaming agent thereby forming a polymer foam core consisting of said slowly water soluble polymer and said bubbles and a solid polymer shell surrounding the core, wherein the slowly water soluble polymer has a dissolution rate such that it takes at least two hours to dissolve 35% of the mass of the ball sealer when exposed to water maintained at a temperature and pH consistent with that in the well, and further wherein the ball sealer exhibits a density of 1.1 g/cc or less and a crush strength of 1,000 psi (~69 dyne/cm) or more when dry.

2. The ball sealer of claim 1, wherein the slowly water-soluble polymer is at least one of polyvinyl alcohol (PVOH), polyglycolic acid (PGA), polytrimethylene terephthalate (PTT), polylactic acid (PLA), polybutylene succinate (PBS), polybutylene adipate terephthalate (PBAT), polybutylene adipate succinate (PBAS), polyvinyl acetate (PVA), polyethylene oxides (PEO), ethylene vinyl alcohol copolymers (EVOH), chitosan, and collagen.

3. The ball sealer of claim 2, wherein the slowly water-soluble polymer is composed of a blend of two or more polymers.

4. The ball sealer of claim 1, wherein the ball sealer exhibits a density of 1.05 g/cc or less.

5. The ball sealer of claim 4, wherein the ball sealer exhibits a density of 1.00 g/cc or less.

6. The ball sealer of claim 1, wherein the ball sealer is formed solely from a single slowly water soluble polymer or blend of slowly water soluble polymers.

7. The perforation ball sealer of claim 1, wherein the ball sealer is essentially spherical and the thickness of the solid polymer shell is about 26% to about 40% of the radius of the essentially spherical ball sealer.

8. The perforation ball sealer of claim 7, wherein the thickness of the solid polymer shell is about 28 to 36% of the radius of the essentially spherical ball sealer.

9. The perforation ball sealer of claim 8, wherein the thickness of the solid polymer shell is about 32% of the radius of the essentially spherical ball sealer.

10. A perforation ball sealer for use in temporarily plugging a perforation in an oil or gas well, the perforation ball sealer being made by injection molding a molten mass of a slowly water soluble polymer containing bubbles generated during injection molding by a physical or chemical foaming agent, the perforation ball sealer further comprising a polymer foam core and a shell surrounding the core, wherein the slowly water soluble polymer has a dissolution rate such that it takes at least two hours to dissolve 35% of the mass of the ball sealer when exposed to water maintained at a temperature and pH consistent with that in the well, wherein the ball sealer exhibits a density of 1.1 g/cc or less and a crush strength of 1,000 psi (~69 dyne/cm) or more when dry, and further wherein all of the gas bubbles in the polymer foam core are generated by the foaming agent contained in the molten mass of slowly water soluble polymer.

11. A process for temporarily plugging perforations in an oil or gas well comprising introducing into the well an aqueous treatment fluid containing a mass of the ball sealers of claim 1.

12. A perforation ball sealer which is made by injection molding a slowly water soluble polymer and a foaming agent thereby forming a ball sealer product comprising a polymer foam core in which all of the bubbles of the polymer foam core consist of gas derived from said foaming agent and a polymer shell surrounding the core, wherein the slowly water soluble polymer has a dissolution rate such that the ball sealer effectively loses its ability to seal a perforation in which it is received after two hours or more, the perforation ball sealer exhibiting a density of 1.1 g/cc or less and a crush strength of 1,000 psi (~69 dyne/cm) or more when dry.

13. The perforation ball sealer of claim 12, wherein the slowly water soluble polymer is made molten during injection molding and further wherein the gas bubbles are generated by injecting a physical foaming agent into the molten slowly water-soluble polymer or by a chemical foaming agent included in the molten slowly water-soluble polymer.

14. The perforation ball sealer of claim 13, wherein the gas bubbles are generated by a chemical foaming agent.

15. The perforation ball sealer of claim 14, wherein the chemical foaming agent is an endothermic chemical foaming agent.

16. The perforation ball sealer of claim 12, wherein the slowly water-soluble polymer is composed of a blend of two or more polymers.

17. The perforation ball sealer of claim 12, wherein the ball sealer exhibits a density of 1.05 g/cc or less.

18. A perforation ball sealer for use in temporarily plugging a perforation in an oil or gas well, the perforation ball sealer comprising a polymer foam core and a shell surrounding the core, wherein all of the bubbles in the polymer foam core consist of a gas, wherein the perforation ball sealer is formed solely from gas and at least one slowly water soluble polymer, wherein the slowly water soluble polymer has a dissolution rate such that the ball sealer effectively loses its ability to seal a perforation in which it is received after two hours or more, and wherein the perforation ball sealer exhibits a density of 1.1 g/cc or less and a crush strength of 1,000 psi (~69 dyne/cm) or more when dry.

19. The perforation ball sealer of claim 18, wherein the perforation ball sealer is formed solely from gas and a single slowly water soluble polymer or a single blend of slowly water soluble polymers.

20. A perforation ball sealer for use in temporarily plugging a perforation in an oil or gas well, the perforation ball sealer comprising a solid phase consisting of a slowly water soluble polymer and gas bubbles dispersed in the solid phase, wherein all of the gas bubbles dispersed in the solid phase consist of a gas, wherein the slowly water soluble polymer together with the gas bubbles form a polymer foam core, wherein the slowly water soluble polymer further forms a polymer shell surrounding the polymer foam core, wherein the slowly water soluble polymer has a dissolution rate such that it takes at least two hours to dissolve 35% of the mass of the ball sealer when exposed to water maintained at a temperature and pH consistent with that in the well, and wherein the perforation ball sealer exhibits a density of 1.1 g/cc or less and a crush strength of 1,000 psi (~69 dyne/cm) or more when dry.

21. The perforation ball sealer of claim 20, wherein the solid phase of the perforation ball sealer consists of a single slowly water soluble polymer or a single blend of slowly water soluble polymers.

22. A perforation ball sealer which is made by injection molding a slowly water soluble polymer and a foaming agent thereby forming a ball sealer product comprising a polymer foam core and a polymer shell surrounding the polymer foam core,
wherein all of the bubbles of the polymer foam core are formed from gas derived from said foaming agent,
wherein the slowly water soluble polymer has a dissolution rate such that the ball sealer effectively loses its ability to seal a perforation in which it is received after two hours or more,
wherein the volume of the foam core is large enough so that the perforation ball sealer exhibits a density of 1.1 g/cc or less, and further
wherein the thickness of the polymer shell is large enough so that the perforation ball sealer exhibits a crush strength of 1,000 psi (~69 dyne/cm) or more when dry.

23. The perforation ball sealer of claim 22, wherein the volume of the foam core is large enough so that the perforation ball sealer exhibits a density which is 70 to 90% of the density of an otherwise identical ball sealer made without said foaming agent.

24. The perforation ball sealer of claim 23, wherein the volume of the foam core is large enough so that the perforation ball sealer exhibits a density which is 75 to 88% of the density of an otherwise identical ball sealer made without said foaming agent.

25. The perforation ball sealer of claim 22, wherein the thickness of the polymer shell is large enough so that the perforation ball sealer exhibits a crush strength of 1,500 psi (~103 dyne/cm) or more when dry.

26. The perforation ball sealer of claim 25, wherein the thickness of the polymer shell is large enough so that the perforation ball sealer exhibits a crush strength of 2,000 psi (~138 dyne/cm) or more when dry.

\* \* \* \* \*